US011991508B2

(12) United States Patent
Wu et al.

(10) Patent No.: US 11,991,508 B2
(45) Date of Patent: May 21, 2024

(54) SYSTEM AND METHOD FOR ELECTROSTATIC DISCHARGE PROTECTION

(71) Applicant: Hewlett-Packard Development Company, L.P., Spring, TX (US)

(72) Inventors: Liying Wu, Suzhou (CN); Zhenhui Wang, Suzhou (CN); Kun Meng, Suzhou (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 123 days.

(21) Appl. No.: 17/842,720

(22) Filed: Jun. 16, 2022

(65) Prior Publication Data

US 2023/0199385 A1 Jun. 22, 2023

(30) Foreign Application Priority Data

Dec. 16, 2021 (CN) ......................... 202111544214.1

(51) Int. Cl.
*H04R 1/10* (2006.01)
*H04R 3/00* (2006.01)

(52) U.S. Cl.
CPC ........... *H04R 3/007* (2013.01); *H04R 1/1008* (2013.01); *H04R 1/1041* (2013.01); *H04R 1/105* (2013.01); *H04R 2420/09* (2013.01)

(58) Field of Classification Search
CPC .... H04R 3/007; H04R 1/1008; H04R 1/1041; H04R 1/105
See application file for complete search history.

(56) References Cited

U.S. PATENT DOCUMENTS

| | | | | |
|---|---|---|---|---|
| 6,963,110 | B2 | 11/2005 | Woo et al. | |
| 10,062,742 | B2 | 8/2018 | Yamazaki et al. | |
| 2016/0336741 | A1* | 11/2016 | Chen | H01L 27/0255 |
| 2019/0114450 | A1 | 4/2019 | Butler et al. | |
| 2020/0228156 | A1 | 7/2020 | Rose et al. | |
| 2020/0265398 | A1* | 8/2020 | Lembo | G06F 1/30 |
| 2021/0019111 | A1* | 1/2021 | Lee | H04R 1/1041 |
| 2021/0240249 | A1* | 8/2021 | Bodnaruk | G06F 13/4282 |
| 2021/0379996 | A1* | 12/2021 | Mosebach | G06F 1/3215 |
| 2023/0118417 | A1* | 4/2023 | Fish | H04R 3/00 710/72 |

* cited by examiner

*Primary Examiner* — Simon King
(74) *Attorney, Agent, or Firm* — Quarles & Brady LLP

(57) ABSTRACT

An electronic apparatus that includes a first port configured to receive an incoming audio signal, a second port, and a controller configured to be coupled to the first port and the second port. The electronic apparatus further includes a switch configured to selectively decouple the controller from the second port when the first port receives the incoming audio signal. Decoupling the controller prevents an electrostatic discharge occurring on the second port from reaching the controller when the controller is receiving the incoming audio signal from the first port.

20 Claims, 4 Drawing Sheets

SYSTEM AND METHOD FOR ELECTROSTATIC DISCHARGE PROTECTION

CROSS REFERENCE TO RELATED APPLICATIONS

This application claims priority under 35 U.S.C. § 119(a) to Chinese Patent Application No. 202111544214.1 filed on Dec. 16, 2021. Chinese Patent Application No. 202111544214.1 is incorporated herein by reference in its entirety.

BACKGROUND

Electronic systems frequently include wireline connectors, such as one or more Universal Serial Bus (USB) ports, and a wireless connection, such as a Bluetooth transceiver. In some devices, multiple wireline connectors may be coupled to a common controller that drives the multiple wireline connectors. For example, an audio headset may have a standard USB port that may be connected to an audio source (e.g., mobile phone, computer, desk telephone) by a USB cable. This enables the user to listen to music or engage in a phone conversation through the audio headset. The audio headset may also include a custom USB port that allows the audio headset to be mounted on a charging cradle that charges a battery in the audio headset to support, for example, Bluetooth wireless operation. It is common for a single USB controller to be connected to both the standard USB port and the custom USB port.

However, this may present an electrostatic discharge (ESD) problem. For example, if the standard USB port is connected to a phone by a USB cable and the user inadvertently touches the pins on the custom USB port during a phone call, an electrostatic discharge may occur that interrupts and terminates the phone call in progress.

SUMMARY

In general, in one aspect of the present disclosure, one or more embodiments relate to an electronic apparatus that includes a first port configured to receive an incoming audio signal, a second port, and a controller configured to be coupled to the first port and the second port. The electronic apparatus further includes a switch configured to selectively decouple the controller from the second port when the first port receives the incoming audio signal. Decoupling the controller prevents an electrostatic discharge occurring on the second port from reaching the controller when the controller is receiving the incoming audio signal from the first port.

In another aspect of the present disclosure, one or more embodiments relate to an audio headset that includes an earphone and a headband configured to support the earphone. The earphone includes a first port configured to receive an incoming audio signal, a second port, and a controller configured to be coupled to the first port and the second port. The electronic apparatus further includes a switch configured to selectively decouple the controller from the second port when the first port receives the incoming audio signal. Decoupling the controller prevents an electrostatic discharge occurring on the second port from reaching the controller when the controller is receiving the incoming audio signal from the first port.

In another aspect of the disclosure, one or more embodiments relate to a method that includes determining that a first port of an audio device is receiving an incoming audio signal, wherein the audio device comprises a second port connected to the first port by a common data line. The method further includes disconnecting the second port from the common data line to prevent an electrostatic discharge from interrupting the incoming audio signal.

Other aspects of the disclosure will be apparent from the following description and the appended claims.

BRIEF DESCRIPTION OF DRAWINGS

Specific embodiments of the disclosure will now be described in detail with reference to the accompanying figures. Like elements in the various figures are denoted by like reference numerals for consistency

DETAILED DESCRIPTION

In general, embodiments of the disclosure provide an electrostatic discharge protection circuit for use in an electronic device that includes a pair of wireline ports that are coupled by common signal lines to a single wireline controller. In the exemplary embodiment described below, an audio headset is described that includes two Universal Serial Bus (USB) ports that are connected to and controlled by a single USB controller. The audio headset includes a control switch that prevents an electrostatic discharge (ESD) on one USB port from interrupting an audio mode, telephone mode, USB charging mode, or idle mode operation on the other USB port. It should be understood, however, that the teachings of the present disclosure and the claims herein are not limited to audio headsets or to USB ports and USB controllers. More generally, the present disclosure is applicable to any electronic device that has two or more wireline ports coupled to a common controller by differential pairs of data lines.

Figure 1:
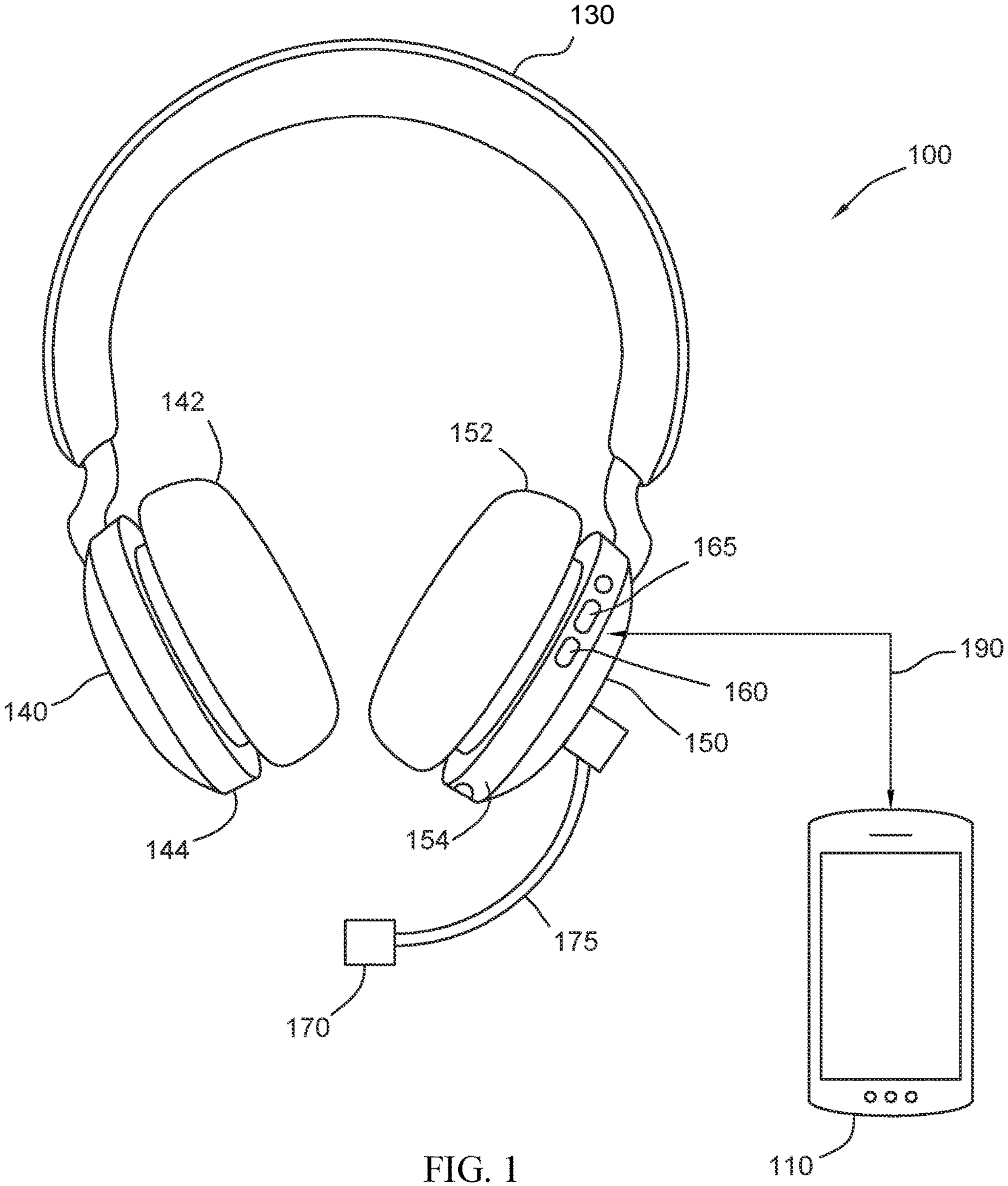
FIG. 1 shows an audio headset in accordance with one or more embodiments of the disclosure.

FIG. 1 shows an audio headset 100 in accordance with one or more embodiments of the disclosure. In the embodiment shown, the audio headset 100 is coupled to a mobile phone 110 by means of a USB cable 190. The audio headset 100 includes a headband 130, an earphone 140, and an earphone 150. The earphones 140 and 150 are mounted on the headband 130, which is configured to support the earphones 140 and 150. The earphone 140 includes a speaker cushion 142 and a speaker cup 144 and the earphone 150 includes a speaker cushion 152 and a speaker cup 154. The audio headset 100 includes a microphone 170 and a microphone boom 175 that are mounted on the earphone 150. The earphone 150 further includes a standard USB-C port 165 and a custom USB-C port 160.

The audio headset 100 supports an audio mode in which music or other audio is streamed from the mobile phone 110 to the standard USB-C port 165 by USB cable 190. The audio headset 100 also supports a telephone mode in which the user conducts a phone call via the mobile phone 110. In telephone mode, the voice of the user is picked up by the microphone 170 and transmitted by the standard USB-C port 165 to the mobile phone 110 via USB cable 190 and the voice audio of the other party to the call is transmitted from the mobile phone 110 to the standard USB-C port 165 by USB cable 190. The audio headset 100 supports a USB charge mode in which a USB charging cable is connected to the standard USB-C port 165. The audio headset 100 also supports an idle mode in which neither USB-C port is connected to a USB cable.

Sometimes, in a cradle charging mode, the audio headset 100 may be coupled to a charging cradle or another device by the custom USB-C port 160. Due to the close proximity of the standard USB-C port 165 and the custom USB-C port 160, the user may inadvertently touch the pins of the custom USB-C port 160 while the standard USB-C port 165 is conducting a phone call or streaming music or other audio to audio headset 100. This may result in an electrostatic discharge (ESD) that terminates the phone call or interrupts the streaming audio. Additionally, in idle mode or USB charging mode, it is still possible for an inadvertent user touch to cause an electrostatic discharge.

Figure 2:
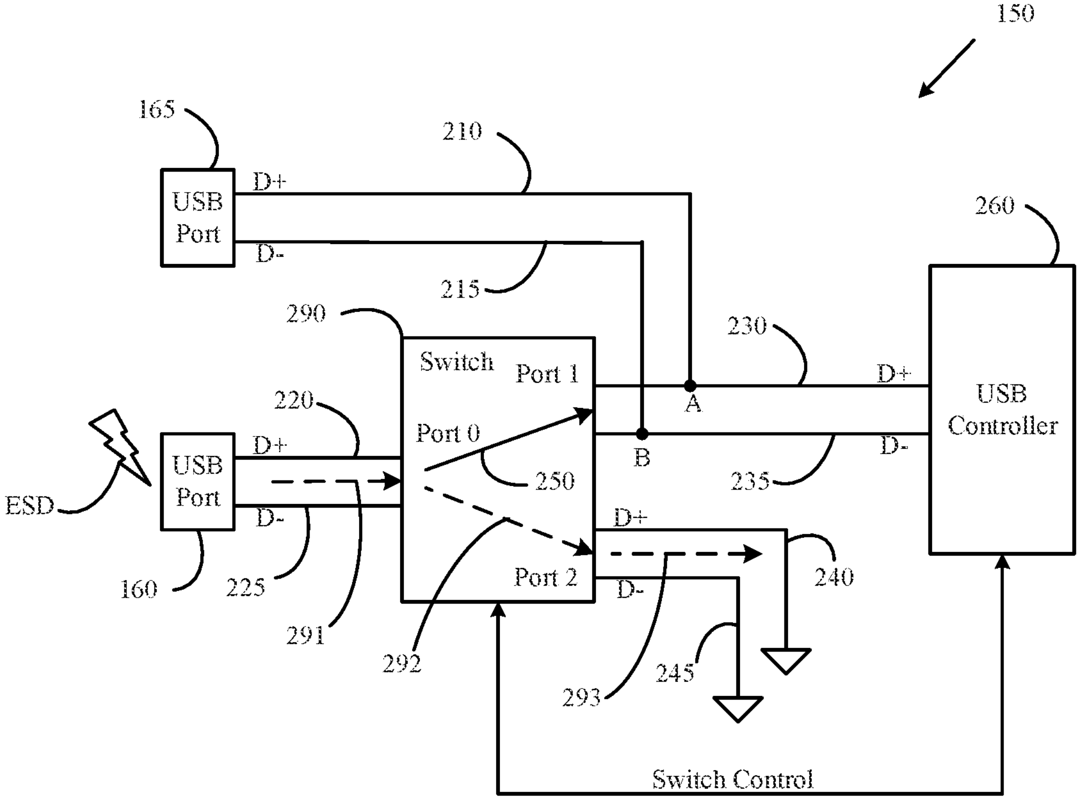
FIG. 2 shows a schematic of electronic components of an audio headset in accordance with one or more embodiments of the disclosure.

FIG. 2 shows a schematic of electronic components of an audio headset 100 in accordance with one or more embodiments of the disclosure. The earphone 150 includes custom USB-C port 160, standard USB-C port 165, a USB controller 260, and a switch 290. The custom USB-C port 160 and the standard USB-C port 165 are coupled to the USB controller 260 by pairs of differential signal data lines D+ and D−. The switch path 250 of switch 290 is represented as a solid line arrow inside of switch 290. In a default position, the switch path 250 is connected between input Port 0 and output Port 1.

Switch 290 is an ESD protection circuit inserted between the custom USB-C port 160 and nodes A and B. Switch 290 provides electrical isolation between the custom USB-C port 160 and the standard USB-C port 165 and the USB controller 260, depending on the position of the switch 290. The USB controller 260 is configured to control the position of the switch 290 by means of a switch control signal.

A first data line 230 is connected to the D+ pin of USB controller 260 at one end and splits into D+ data line 210 and D+ data line 220 at node A. The D+ data line 210 is connected between Node A and the D+ pin of the standard USB-C port 165. The D+ data line 220 is coupled between Node A and the D+ pin of the custom USB-C port 160 through switch 290. In the default position, switch path 250 is part of the D+ data line 220 that connects Node A and the D+ pin of the custom USB-C port 160. Data line 230, data line 210, and data line 220 (including switch path 250) are all shorted together and form a common data path when the switch 290 is in the default position.

A second data line 235 is connected to the D− pin of USB controller 260 at one end and splits into D− data line 215 and D− data line 225 at node B. The D− data line 215 is connected between Node B and the D− pin of the standard USB-C port 165. The D− data line 225 is coupled between Node B and the D− pin of the custom USB-C port 160 through switch 290. In the default position, switch path 250 is part of the D− data line 225 that connects Node B and the D− pin of the custom USB-C port 160. Data line 235, data line 215, and data line 225 (including switch path 250) are all shorted together and form a common data path when the switch 290 is in the default position.

If one or both of the D+ and D− pins on custom USB-C port 160 is touched, an electrostatic discharge path exists from the custom USB-C port 160 to the USB controller 260 when the switch 290 is in the default position. If the audio device 100 is operating in audio mode or telephone mode on the standard USB-C port 165, then the audio data between the standard USB-C port 165 and the USB controller 260 may be interrupted by the ESD from the custom USB-C port 160. If ESD power is directly transferred to the USB controller 260, the result may be USB controller 260 error and loss of connection with the USB host (i.e., mobile phone 110).

Switch 290 provides a solution to this problem by opening the connection between the standard USB-C port 165 and the custom USB-C port 160 and the USB controller 260 and directing an ESD power surge away from the USB controller 160. When switch 290 is moved out of the default position, such that switch path 250 is connected between input Port 0 and output Port 2, a discharge path is created that directs the ESD power surge to system ground by data lines 240 and 245. The discharge path is indicated by dotted lines 291, 292, and 293. When switch path 250 is connected to output Port 2, the open circuit between input Port 0 and output Port 1 electrically isolates custom USB-C port 160 from Nodes A and B and, therefore, the standard USB-C port 165 and the USB controller 260

In a default mode, the USB controller 260 normally connects the input Port 0 of the switch 290 to the output Port 1 of the switch 290. In this manner, the USB controller 260 is capable of detecting or determining when the audio headset 100 is connected to a charging cradle (not shown) by the custom USB-C port 160. At the same time, if the USB controller 260 detects or determines that the USB cable 190 has been connected to the standard USB-C port 165, then the USB controller 260 determines that the audio headset 100 is in or is entering audio mode or telephone mode. In response, the USB controller 260 connects the input Port 0 of the switch 290 to the output Port 2 of the switch 290.

Figure 3:
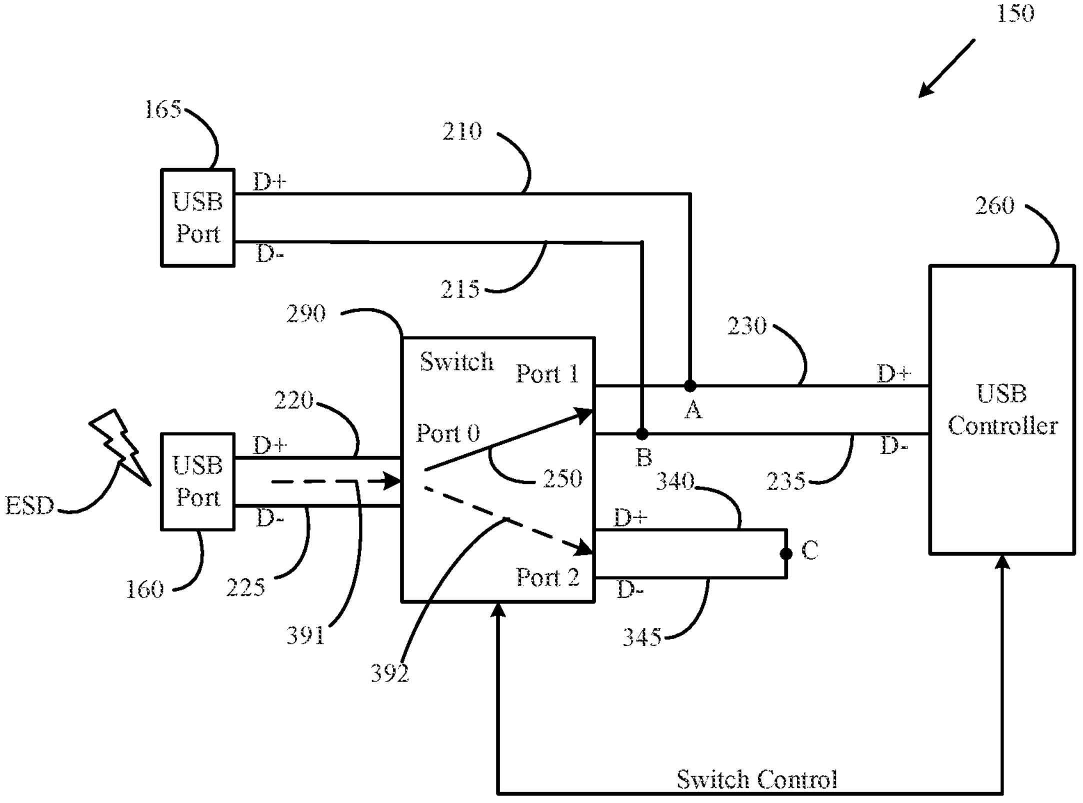
FIG. 3 shows a schematic of electronic components of an audio headset in accordance with an alternate embodiment of the disclosure.

FIG. 3 shows a schematic of electronic components of an audio headset 100 in accordance with an alternate embodiment of the disclosure. The circuitry in FIG. 3 is the same as the circuitry in FIG. 2 except that the D+ and D− differential signal data lines on the output Port 2 are coupled by means of data lines 340 and 345 to each other at node C, rather than being connected to system ground. Data lines 340 and 345 comprise a wireline connection that shorts together the D+ and D− signal data lines on the output Port 2. Thus, an ESD power surge on either the D+ signal line or the D− signal line is simply discharged into the other signal line rather than into the USB controller 260. The switch 290 performs ESD protection in a substantially similar manner to that illustrated in FIG. 2, namely, switch 290 switches to output Port 2 when the standard USB-C port 165 is connected to a USB cable.

Figure 4:
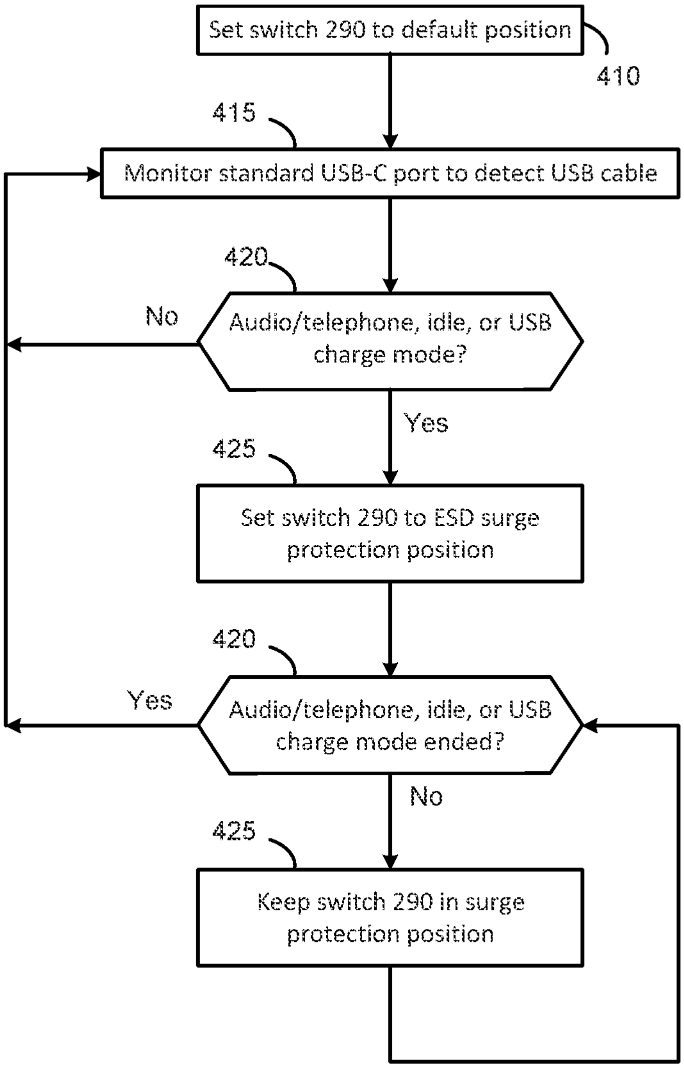
FIG. 4 shows a flow diagram, in accordance with one or more embodiments of the disclosure.

FIG. 4 shows a flow diagram, in accordance with one or more embodiments of the disclosure. Initially, in 410, the USB controller 260 sets switch 290 to a default position that connects the USB controller 260 to both the standard USB-C port 165 and the custom USB-C port 160. In 415, the USB controller 260 monitors the standard USB-C port 165 to detect connection of the USB cable 190. In response, the USB controller 260 determines in 420 whether the audio headset 100 is entering audio mode, telephone mode, USB charging mode, or idle mode. The USB controller 260 may make this determination by the simple fact of connection to the USB cable 190. Alternatively, the USB controller 260 may make this determination after detecting an incoming audio data stream or a command message on the USB cable 190 from the mobile phone 110.

If No in 420, the USB controller 260 continues to monitor the standard USB-C port 165. If Yes in 420, the USB controller 260 in 425 sets switch 290 to an ESD protection position. At this point, any ESD power surge caused by touching either the D+ pin or the D− pin of the custom USB-C port 160 will be directed to system ground or into the other one of the D+ pin or the D− pin of the custom USB-C port 160, as discussed above. In 430, the USB controller 260 determines whether the audio mode, telephone mode, USB charging mode, or idle mode has ended. If No in 430, the USB controller 260 in 435 keeps the switch 290 in the ESD protection position. If Yes in 430, the USB controller 260 may return to detecting the USB cable 190 and/or determining whether the audio headset 100 is entering audio mode or telephone mode.

The disclosed apparatus avoids the problems associated with an electrostatic discharge by providing a safe discharge path for an ESD event if the differential signal lines on the custom USB-C port are accidentally touched. The control switch prevents an electrostatic discharge (ESD) on one USB port from interrupting an audio mode, telephone mode, USB charging mode, or idle mode operation on the other USB port. The safe discharge path may be from the differential signal lines to system ground or from one differential signal line to the other differential signal line.

In the above detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the disclosure, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electronic apparatus (100) comprising:
- a first port (165) configured to receive an incoming audio signal;
- a second port (160);
- a controller (260) configured to be coupled to the first port (165) and the second port (160); and
- a switch (290) configured to selectively decouple the controller (260) from the second port (160) when the first port receives the incoming audio signal, wherein decoupling the controller (260) prevents an electrostatic discharge occurring on the second port (160) from reaching the controller (260) when the controller (260) is receiving the incoming audio signal from the first port (165).

2. The electronic apparatus (100) of claim 1, wherein the first port (165) and the second port (160) are Universal Serial Bus (USB) ports.

3. The electronic apparatus (100) of claim 2, wherein the controller (260) is a USB controller (260).

4. The electronic apparatus (100) of claim 1, further comprising a system ground coupled to the switch (290), wherein selectively decoupling the controller (260) further comprises coupling the second port to the system ground.

5. The electronic apparatus (100) of claim 1, further comprising a wireline connection between a first signal line on an output port of the switch (290) and a second signal line on the output port of the switch (290), wherein selectively decoupling the controller 260 further comprises coupling the second port to the first signal line and the second signal line on the output port of the switch (290).

6. The electronic apparatus (100) of claim 5, wherein the switch (290) is configured to couple a pair of differential signal lines on the second port to the first signal line and the second signal line on the output port of the switch (290).

7. The electronic apparatus (100) of claim 6, wherein the controller (260) is configured to control a position of the switch path (250).

8. The electronic apparatus (100) of claim 7, wherein the switch (290) comprises an input port coupled to the second port (160) and a first output port coupled to the controller (260).

9. An audio headset (100) comprising:
- an earphone (150);
- a headband (130) configured to support the earphone, wherein the earphone (150) comprises:
  - a first port (165) configured to receive an incoming audio signal;
  - a second port (160);
  - a controller (260) configured to be coupled to the first port (165) and the second port (160); and
  - a switch (290) configured to selectively decouple the controller (260) from the second port (160) when the first port receives the incoming audio signal, wherein decoupling the controller (260) prevents an electrostatic discharge occurring on the second port (160) from reaching the controller (260) when the controller (260) is receiving the incoming audio signal from the first port (165).

10. The audio headset (100) of claim 9, wherein the first port (165) and the second port (160) are Universal Serial Bus (USB) ports.

11. The audio headset (100) of claim 10, wherein the controller (260) is a USB controller (260).

12. The audio headset (100) of claim 9, further comprising a system ground coupled to the switch (290), wherein selectively decoupling the controller (260) further comprises coupling the second port to the system ground.

13. The audio headset (100) of claim 9, further comprising a wireline connection between a first signal line on an output port of the switch (290) and a second signal line on the output port of the switch (290), wherein selectively decoupling the controller 260 further comprises coupling the second port to the first signal line and the second signal line on the output port of the switch (290).

14. The audio headset (100) of claim 13, wherein the switch (290) is configured to couple a pair of differential signal lines on the second port to the first signal line and the second signal line on the output port of the switch (290).

15. The audio headset (100) of claim 14, wherein the controller (260) is configured to control a position of the switch path (250).

16. The audio headset (100) of claim 15, wherein the switch (290) comprises an input port coupled to the second port (160) and a first output port coupled to the controller (260).

17. A method comprising:

determining that a first port (165) of an audio device (100) is receiving an incoming audio signal, wherein the audio device (100) comprises a second port (160) connected to the first port (165) by a common data line (210, 220, 230); and disconnecting the second port (160) from the common data line (210, 220, 230) to prevent an electrostatic discharge from interrupting the incoming audio signal.

18. The method of claim 17, wherein disconnecting the second port (160) comprises moving a switch path (250) of a switch (290) out of a first position in which the second port (160) is coupled to the common data line (210, 220, 230).

19. The method of claim 18, wherein disconnecting the second port (160) from the common data line (210, 220, 230) further comprises moving the switch path (250) to a second switch position in which the second port (160) is coupled to a system ground.

20. The method of claim 18, wherein disconnecting the second port (160) from the common data line (210, 220, 230) further comprises moving the switch path (250) to a second switch position in which a first pin of the second port (160) is coupled to a second pin of the second port (160).

* * * * *